UNITED STATES PATENT OFFICE.

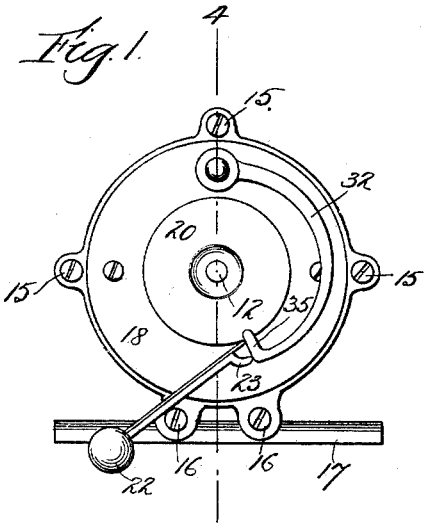

HERBERT McNULTA, OF CHICAGO, ILLINOIS.

FISHING-REEL.

SPECIFICATION forming part of Letters Patent No. 592,593, dated October 26, 1897.

Application filed July 13, 1896. Serial No. 598,966. (No model.)

*To all whom it may concern:*

Be it known that I, HERBERT MCNULTA, a citizen of the United States, residing at Chicago, in the county of Cook and State of Illinois, have invented certain new and useful Improvements in Fishing-Reels, of which the following is a specification, reference being had to the accompanying drawings, in which—

Figure 1 is a side elevation. Fig. 2 is an edge view. Fig. 3 is a vertical section on line 3 3 of Fig. 4. Fig. 4 is a cross-section on line 4 4 of Fig. 1. Fig. 5 is a vertical section on line 5 5 of Fig. 4. Fig. 6 is an enlarged detail, being a sectional view on line 6 6 of Fig. 4; and Fig. 7 is an enlarged detail, being a section on line 7 7 of Fig. 3.

My invention relates to fishing-reels of that class in which a spool is rotated to reel up the line by means of a tape, cord, chain, or other similar device wound upon a drum and arranged to be drawn out by the operator to rotate the spool. In reels of this class it is necessary, in order to effect a complete reeling up of the line, for the operator to draw out the tape a number of times, the tape being rewound on its drum after each drawing operation by a suitable spring. One of the most important objections to reels of this class as heretofore constructed is that they have not been provided with means for locking the spool to prevent unreeling while the tape is being rewound on the drum for a repetition of the reeling operation. Consequently, unless the operator uses some extraneous device, such as his finger, to prevent unwinding of the spool on such occasions, the fish may unreel the line, and the danger of snarls is greatly increased.

The principal feature of my present invention resides in the provision of a reel with mechanism which automatically acts to lock the reel against unwinding whenever the winding-tape is not under tension, except when it is fully wound up on its drum, in which case the lock is automatically thrown out of operative position.

My invention also contemplates certain other improvements, which will be hereinafter specifically pointed out.

That which I regard as new will be set forth in the claims.

In the drawings, 8 indicates the spool of the reel, consisting of a hub or sleeve 9 and dished side pieces 10 11. The reel 8 is loosely mounted upon a shaft 12, extending through side pieces 13 14, which form, with cross-bars 15 16, the usual reel-frame.

17 indicates the usual plate for securing the reel to the rod. As shown in Fig. 4, one end of the shaft 12 is journaled in the side piece 13, the other end thereof being journaled in a plate 18, having a peripheral flange 19, by which it is connected to the plate 14. The plate 18 forms a case in which are contained certain of the working parts of the reel.

20 indicates a drum which is mounted upon one end of the shaft 12, which projects beyond the plate 18, said drum being fixedly connected to said shaft.

21 indicates a tape, one end of which is connected to said drum and which is arranged to be wound thereupon, a suitable channel being formed in the periphery of said drum to receive said tape. The tape 21 is provided with a button 22 or other suitable grip for the hand and with a finger 23, arranged near the button 22, for a purpose to be hereinafter set forth. It will be seen that by pulling the tape 21 the shaft 12 may be rotated. To rewind the tape 21 upon the drum 20, a spring 24 is provided, which is connected to the opposite end of the shaft 12 and to a case 25, secured at the outside of the plate 13, as shown in Figs. 4 and 5. When the tape 21 is released, therefore, it will be at once rewound upon the drum 20 by the spring 24.

For the purpose of communicating the rotary movement of the shaft 12 in one direction to the spool 8 pawl-and-ratchet mechanism is provided for connecting said two parts, such mechanism being illustrated in Figs. 3 and 4. As shown in Fig. 4, the sleeve 9 extends through the plate 14 and carries a broad ratchet-wheel 26, which is keyed thereto. At the side of the ratchet-wheel 26 the shaft 12 carries a cross-head 27, which is keyed to said shaft, as shown in Fig. 3. At the ends of the cross-head 27 are pivoted pawls 28 29, having their engaging faces arranged in opposite directions, as shown in Fig. 3, so that they will operate similarly upon the ratchet-wheel 26. 30 indicates a link which connects the rear end of the pawl 28 with the forward end of the pawl 29, as best shown in Fig. 3, the object of which is to cause said pawls to act together.

31 indicates a spring which bears against one of the pawls 28 or 29 and serves to normally hold such pawls in engagement with the ratchet-wheel 26. The result of this construction is that when the pawls are free to act normally they will engage the ratchet-wheel 26, and therefore when the tape 21 is drawn out the rotation of the shaft 12 will effect the rotation of the spool in such a direction as to reel in the line. In order that the line may be paid out, it is necessary that the pawls 28 and 29 be moved out of engagement with the ratchet-wheel 26, and for this purpose I provide mechanism which automatically moves the pawls 28 and 29 out of engagement with the ratchet-wheel 26 when the tape is completely wound upon its drum, as then only is it desirable or necessary that the spool be free to unwind. Such mechanism consists of an external lever 32, which is connected to a sleeve 33, mounted upon a pin 34, secured in the plates 14 and 18, as shown in Fig. 4. The sleeve 33 is provided at its lower end with a fork or loop 35, through which the tape 21 passes and with which the finger 23 is adapted to engage, as shown in Fig. 1. 36 indicates a second lever which is connected to a sleeve 37, arranged within the case formed by the plate 18 and flange 19, which sleeve also is mounted upon the pin 34. The lever 36 is arranged in the same vertical plane with the pawls 28 and 29 and is curved, so that when moved inwardly said lever will strike the rear end of the adjacent pawl 28 or 29, consequently throwing the forward ends of both pawls outward from the ratchet-wheel and releasing said wheel.

While I have shown two pawls 28 and 29, I desire it to be understood that but one of these parts, 28, need perform the function of a pawl. The other, 29, need not be a pawl. It is only essential that it serve as a contact device with which the lever 36 may engage and through the medium of the link 30 throw the pawl 29 out of engagement with the ratchet-wheel.

The rocking of the lever 36 is effected by a pin 38, which is secured to the sleeve 33 and engages an arm 39, secured to the sleeve 37, as shown in Figs. 3 and 6. By rocking the lever 32, therefore, the lever 36 will be rocked. The lever 32 is rocked outward under the tension of the spring 24 whenever the tape is fully wound upon its drum, and such outward rocking of the lever 32 causes a corresponding inward rocking of the lever 36, throwing the pawls 28 and 29 out of engagement with the ratchet-wheel 26, as above described. The result is that whenever the tape is completely wound up upon the drum 20 the pawls 28 and 29 will be out of engagement with the ratchet-wheel 26 and the spool will be free to unwind.

The spool is prevented from unwinding while the tape is being rewound upon its drum by a dog 40, which is secured to the sleeve 37, as best shown in Fig. 3, and is moved into engagement with the teeth of the ratchet-wheel 26 by a spring 41. The spring 41 is, however, weaker than the spring 24, so that when the tape 21 is wound upon its drum the lever 32 will be held back in the position shown in Fig. 1, thereby holding the dog 40 out of engagement with the ratchet-wheel 26, leaving the spool free to rotate. When, however, the tape 21 is drawn out, so that the finger 23 does not bear against the lever 32, the lever 32 is not subjected to the action of the spring 24. Consequently the spring 41 is free to move the dog 40 into engagement with the ratchet-wheel 26. At the same time this rocks the sleeve 37, throwing the lever 36 away from the ratchet-wheel 26 and allowing the pawls 28 and 29 to move into engagement with said ratchet-wheel. The parts of the mechanism therefore adjust themselves for reeling in as soon as the finger 23 moves out of contact with the lever 32. The dog 40 does not interfere with the reeling-in operation, as it merely slides over the ratchet-teeth. By providing the dog 40 and operating it as described there is no danger of the fish running away with the line while the tape 21 is being rewound upon its drum.

42 indicates a spring-bar which is secured to the plate 14 and carries a brake-block 43, which is adapted to bear against the plate 11, as shown in Fig. 7. 44 indicates a cam brake-lever which is pivoted to the plate 14 and extends between the spring 42 and the plate 14. By rocking the lever 44, therefore, the position of the spring 42 may be adjusted to regulate the pressure of the brake-block 43 upon the disk 11, whereby the spool may be caused to rotate more or less easily, as desired. The lever 44 is preferably provided with a finger-piece 45.

I have described my invention in detail in order that my most approved form will be clearly understood; but I do not wish to be limited to the specific details of construction described, as many modifications may be made without departing from the spirit of my invention. It will be understood, further, that instead of a tape any other equivalent device may be used.

That which I claim as my invention, and desire to secure by Letters Patent, is—

1. In a reel, the combination with a rotatable spool adapted to receive the line, of a drum, a tape thereupon adapted to be drawn out to rotate said spool, and means in operative relation with respect to the spool for restraining said spool from reverse rotation while the tape is being rewound upon said drum, substantially as described.

2. In a reel, the combination with a frame, a shaft arranged therein, and a rotatable spool loosely mounted upon said shaft and adapted to receive the line, of a drum fixedly mounted upon said shaft, a tape thereupon adapted to be drawn out to rotate said shaft, pawl-and-ratchet mechanism for connecting said shaft and spool, and differential spring-actuated mechanism for automatically operating said pawl-and-ratchet mechanism to connect said shaft and spool when the tape is drawn out and disconnect said shaft and spool when the tape has been rewound, substantially as described.

3. In a reel, the combination with a frame, a shaft arranged therein, and a rotatable spool loosely mounted upon said shaft and adapted to receive the line, of a drum fixedly mounted upon said shaft, a tape thereupon adapted to be drawn out to rotate said shaft, pawl-and-ratchet mechanism for connecting said shaft and spool, mechanism for automatically operating said pawl-and-ratchet mechanism to connect said shaft and spool when the tape is drawn out, and means for locking said spool from reverse rotation while the tape is being rewound upon said drum, substantially as described.

4. In a reel, the combination with a frame, a shaft arranged therein, and a rotatable spool loosely mounted upon said shaft and adapted to receive the line, of a drum fixedly mounted upon said shaft, a tape thereupon adapted to be drawn out to rotate said shaft, pawl-and-ratchet mechanism for connecting said shaft and spool, mechanism for automatically operating said pawl-and-ratchet mechanism to connect said shaft and spool when the tape is drawn out, and spring-actuated mechanism for automatically throwing said pawl-and-ratchet mechanism out of operative engagement when said tape has been rewound upon said drum, substantially as described.

5. In a reel, the combination with a frame, a shaft, and a sleeve loosely mounted upon said shaft, of a spool mounted on said sleeve, a ratchet-wheel carried by said sleeve, a drum mounted upon said shaft and keyed thereto, a tape adapted to be wound upon said drum and to be drawn out to rotate said shaft, means for automatically rewinding said tape upon said drum, means for connecting said shaft and sleeve whereby said spool may be rotated by drawing out said tape, a dog adapted to engage said ratchet-wheel, and spring-actuated mechanism for automatically moving said dog into engagement with said ratchet-wheel when said tape is drawn out, substantially as described.

6. In a reel, the combination with a frame, a shaft, and a sleeve loosely mounted upon said shaft, of a spool mounted on said sleeve, a ratchet-wheel carried by said sleeve, a drum mounted upon said shaft and keyed thereto, a tape adapted to be wound upon said drum and to be drawn out to rotate said shaft, means for automatically rewinding said tape upon said drum, means for connecting said shaft and sleeve whereby said spool may be rotated by drawing out said tape, a dog adapted to engage said ratchet-wheel, means for automatically moving said dog into engagement with said ratchet-wheel when said tape is drawn out, and spring-actuated mechanism for automatically throwing said dog out of engagement with said ratchet-wheel when said tape has been rewound upon said drum, substantially as described.

7. In a reel, the combination with a frame, a shaft, and a sleeve loosely mounted upon said shaft, of a spool mounted on said sleeve, a ratchet-wheel carried by said sleeve, a drum mounted upon said shaft and keyed thereto, a tape adapted to be wound upon said drum and to be drawn out to rotate said shaft, means for automatically rewinding said tape upon said drum, means for connecting said shaft and sleeve whereby said spool may be rotated by drawing out said tape, a dog adapted to engage said ratchet-wheel, means for automatically moving said dog into engagement with said ratchet-wheel when said tape is drawn out, and means for automatically throwing said dog out of engagement with said ratchet-wheel when said tape has been rewound upon said drum and simultaneously disconnecting said sleeve and shaft, substantially as described.

8. The combination with a ratchet-wheel 26, of a cross-head 27, pawls 28 29 pivoted to said cross-head, and a link connecting said pawls whereby said pawls will act simultaneously to engage or disengage said ratchet-wheel, substantially as described.

9. The combination with a sleeve, and a ratchet-wheel mounted thereupon, of a shaft, a cross-head mounted thereupon, a pawl 28 pivoted to said cross-head, a device adapted to engage said pawl to move it out of mesh with said ratchet-wheel, means for moving said pawl into mesh with said ratchet-wheel, and a pawl pivoted to the opposite end of said cross-head and connected to said pawl, substantially as and for the purpose specified.

10. The combination with a sleeve, and a ratchet-wheel mounted thereupon, of a shaft, a cross-head mounted thereupon, a pawl 28 pivoted to said cross-head, means for moving said pawl into mesh with said ratchet-wheel, a pawl pivoted to the opposite end of said cross-head and connected to said pawl, a curved lever 36 adapted to engage said pawl to move it out of engagement with said ratchet-wheel, and means for operating said lever, substantially as described.

11. In a reel, the combination with a spool, a drum, and a tape adapted to be wound upon said drum and to be drawn out to rotate said spool, of a lever 32, a device carried by said tape and adapted to rock said lever, and mechanism operated by the rocking of said lever for disconnecting said drum and spool, substantially as described.

12. In a reel, the combination with a spool, a drum, and a tape adapted to be wound upon said drum and to be drawn out to rotate said spool, of a lever 32, a device carried by said tape and adapted to rock said lever, mechanism operated by the rocking of said lever for disconnecting said drum and spool, and a spring for returning said lever to its former position when said tape is drawn out, substantially as described.

13. In a reel, the combination with a spool, a drum, and a tape adapted to be wound upon said drum and to be drawn out to rotate said spool, of a lever 32, means carried by said tape for rocking said lever, a lever 36 coöperating with said lever 32, a sleeve connected to said spool, a ratchet-wheel mounted upon said sleeve, a shaft, a cross-head carried by said shaft, pawls carried by said cross-head and connected together, a dog 40 adapted to engage said ratchet-wheel, a spring 41 adapted to rock said dog and levers 32 and 36, and a spring 24 for winding said tape upon said drum, substantially as described.

14. In a reel, the combination with a rotatable shaft, and a spool adapted to rotate independently of said shaft, of a tape adapted to be drawn out to rotate said shaft, and differential spring-actuated mechanism for automatically connecting said spool and shaft when said tape is drawn out and disconnecting them when the tape has been rewound, substantially as and for the purpose specified.

15. In a reel, the combination with a rotatable shaft, and a spool adapted to rotate independently thereof, of a tape adapted to be drawn out to rotate said shaft, means for automatically connecting said spool and shaft when said tape is drawn out, and means for preventing reverse rotation of said spool while the tape is being rewound, substantially as described.

16. In a reel, the combination with a rotatable shaft, and a spool adapted to rotate independently thereof, of a tape adapted to be drawn out to rotate said shaft, means for automatically connecting said spool and shaft when said tape is drawn out, and spring-actuated mechanism for automatically disconnecting said spool and shaft when said tape has been rewound, substantially as described.

17. In a reel, the combination with a rotatable shaft, and a spool supported loosely thereupon, of a tape adapted to be drawn out to rotate said shaft, mechanism for automatically rewinding said tape, mechanism for automatically connecting said spool and shaft when said tape is drawn out, and mechanism operated by said rewinding mechanism for automatically disconnecting said spool and shaft when the tape has been rewound, substantially as described.

18. In a reel, the combination with a rotatable spool adapted to receive the line, of a drum, a tape thereupon adapted to be drawn out to rotate said spool, means for restraining said spool from reverse rotation while the tape is being rewound upon said drum, and means for releasing said spool when the tape has been rewound, substantially as described.

19. In a reel, the combination with a rotatable spool adapted to receive the line, of a drum, a tape thereupon adapted to be drawn out to rotate said spool, a rewinding-spring, means for restraining said spool from reverse rotation while the tape is being rewound upon said drum, and mechanism operated by said rewinding-spring for releasing said spool when the tape has been rewound, substantially as described.

HERBERT McNULTA.

Witnesses:
JOHN L. JACKSON,
HOLMES A. TILDEN.